United States Patent
Lee et al.

(10) Patent No.: US 7,199,787 B2
(45) Date of Patent: Apr. 3, 2007

(54) APPARATUS WITH TOUCH SCREEN AND METHOD FOR DISPLAYING INFORMATION THROUGH EXTERNAL DISPLAY DEVICE CONNECTED THERETO

(75) Inventors: Ju-Beam Lee, Seoul (KR); Sang-Jun Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 245 days.

(21) Appl. No.: 10/209,826

(22) Filed: Aug. 1, 2002

(65) Prior Publication Data

US 2003/0025678 A1 Feb. 6, 2003

(30) Foreign Application Priority Data

Aug. 4, 2001 (KR) ................................ 2001-47131

(51) Int. Cl.
*G09G 5/00* (2006.01)
(52) U.S. Cl. .................... 345/169; 345/1.1; 345/2.2
(58) Field of Classification Search ................ 345/1.1, 345/2.1, 2.2, 3.1, 1.3, 2.3, 156–184, 903, 345/905; 455/557, 550; 710/301–304; 361/681–683, 361/686; 178/18.01–18.09
See application file for complete search history.

(56) References Cited

U.S. PATENT DOCUMENTS

| | | | | |
|---|---|---|---|---|
| 4,720,703 A * | 1/1988 | Schnarel et al. | ............. | 345/163 |
| 5,689,654 A * | 11/1997 | Kikinis et al. | ............... | 710/303 |
| 5,757,361 A * | 5/1998 | Hirshik | ........................ | 345/156 |
| 5,818,425 A * | 10/1998 | Want et al. | .................. | 345/158 |
| 5,848,373 A * | 12/1998 | DeLorme et al. | ............ | 701/200 |
| 6,309,230 B2 * | 10/2001 | Helot | .......................... | 361/683 |
| 6,323,845 B1 * | 11/2001 | Robbins | ...................... | 345/168 |
| 6,411,283 B1 * | 6/2002 | Murphy | ....................... | 345/173 |
| 6,489,932 B1 * | 12/2002 | Chitturi et al. | ............. | 345/173 |
| 6,538,880 B1 * | 3/2003 | Kamijo et al. | .............. | 361/686 |
| 6,580,422 B1 * | 6/2003 | Reilly | ......................... | 345/169 |
| 2002/0103008 A1 * | 8/2002 | Rahn et al. | .................. | 455/557 |
| 2002/0119800 A1 * | 8/2002 | Jaggers et al. | .............. | 455/550 |
| 2002/0190920 A1 * | 12/2002 | Kung | .......................... | 345/3.1 |
| 2003/0041206 A1 * | 2/2003 | Dickie | ........................ | 710/303 |
| 2003/0222856 A1 * | 12/2003 | Fedorak et al. | ............. | 345/173 |
| 2004/0004603 A1 * | 1/2004 | Gerstner et al. | ............ | 345/169 |
| 2004/0019724 A1 * | 1/2004 | Singleton et al. | ........... | 710/303 |

FOREIGN PATENT DOCUMENTS

JP            9-244780         9/1997

* cited by examiner

*Primary Examiner*—Biipin Shalwala
*Assistant Examiner*—David L. Lewis
(74) *Attorney, Agent, or Firm*—The Farrell Law Firm

(57) ABSTRACT

There is provided an apparatus with a touch screen including a touch pad. The apparatus includes a connecter for connecting the apparatus to an external display device; a sensor for generating a sensing signal upon detecting connection between the apparatus and the external display device; a touch screen display driver for displaying data input from the touch pad on the touch screen; an external display driver for displaying data input from the touch pad on the external display device when the touch pad operates in a mouse pad mode; and a controller for upon receiving the sensing signal, disabling the touch screen display driver, enabling the external display driver, recognizing a point on the touch pad selected by a user, generating a coordinate value corresponding to the point, performing calculation for mapping the coordinate value with a screen display coordinate of the external display device, and determining a position of a pointer to be displayed on a screen of the external display device.

9 Claims, 5 Drawing Sheets

APPARATUS WITH TOUCH SCREEN AND METHOD FOR DISPLAYING INFORMATION THROUGH EXTERNAL DISPLAY DEVICE CONNECTED THERETO

PRIORITY

This application claims priority to an application entitled "Apparatus with Touch Screen and Method for Displaying Information through External Display Device Connected Thereto" filed in the Korean Industrial Property Office on Aug. 4, 2001 and assigned Serial No. 2001-47131, the contents of which are hereby incorporated by reference.

BACKGROUND OF THE INVENTION

1. Field of the Invention

The present invention relates generally to an apparatus with a touch screen and a method for displaying information on a screen of an external display device connected thereto, and in particular, to an apparatus and method for enabling a touch screen to serve as a mouse pad.

2. Description of the Related Art

A touch screen has a user interface function as well as a screen displaying function. That is, when a user, using a touch screen pen (i.e. stylus) or his or her finger, writes letters or symbols, or draws a picture on an LCD (Liquid Crystal Display) covered with a touch panel using the touch screen pen, a pointer shifts along the moving path selected by the user. If the user touches an icon displayed on the screen in a specific mode, a relevant function is performed, and at the same time, its operating state may be displayed on the screen.

A PDA (Personal Digital Assistant) is generally provided with the touch screen. The PDA is a portable device capable of collecting, storing, writing and searching information and also performing a communication function. The PDA is very useful to access personal and company information while on the move, for its small size and light weight. The PDA includes a CPU (Central Processing Unit), a memory, an operating system (OS), and various peripheral devices based on the operating system. Typically, a touch screen LCD and a pen are used as an input device of the PDA.

However, the PDA is limited in size, and therefore the touch screen mounted on the PDA is also small in size. Therefore, it is hard to display all the contents wanted by the user on the touch screen. To solve this problem, the user may connect the PDA to an external display device with a large screen capable of clearly displaying more content or information. The user can also manipulate arrow buttons mounted on the PDA, or manipulate an externally connected keyboard, in order to further control a program operating on the external display device, e.g., an operation of scrolling the screen, moving the pointer, and inputting a command.

SUMMARY OF THE INVENTION

It is, therefore, an object of the present invention to provide an apparatus with a touch screen and a method for enabling a user to easily access an external display device connected thereto.

To achieve the above and other objects, the present invention provides an apparatus with a touch screen that includes a touch pad portion. The apparatus includes a connecter for connecting the apparatus to an external display device; a sensor for generating a sensing signal upon detecting connection between the apparatus and the external display device; a touch screen display driver for displaying data input from the touch pad on the touch screen; an external display driver for displaying data input from the touch pad on the external display device when the touch pad operates in a mouse pad mode; and a controller for, upon receiving the sensing signal, disabling the touch screen display driver, enabling the external display driver, recognizing a point on the touch pad selected by a user, generating a coordinate value corresponding to the point, performing calculation for mapping the coordinate value with a screen display coordinate of the external display device, and determining a position of a pointer to be displayed on a screen of the external display device.

To achieve the above and other objects, the present invention provides a method for displaying on a screen of an external display device information and/or a pointer from a PDA with a touch screen. The method comprises determining whether the PDA is connected to the external display device; performing a calculation for mapping a screen display coordinate of the external display device with a display coordinate of the touch pad upon detecting connection between the PDA and the external display device; and accessing the screen display coordinate of the external display device according to a selection made by the user on the touch pad of the touch screen.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

A preferred embodiment of the present invention will be described herein below with reference to the accompanying drawings. In the following description, well-known functions or constructions are not described in detail since they would obscure the invention in unnecessary detail.

Figure 1:
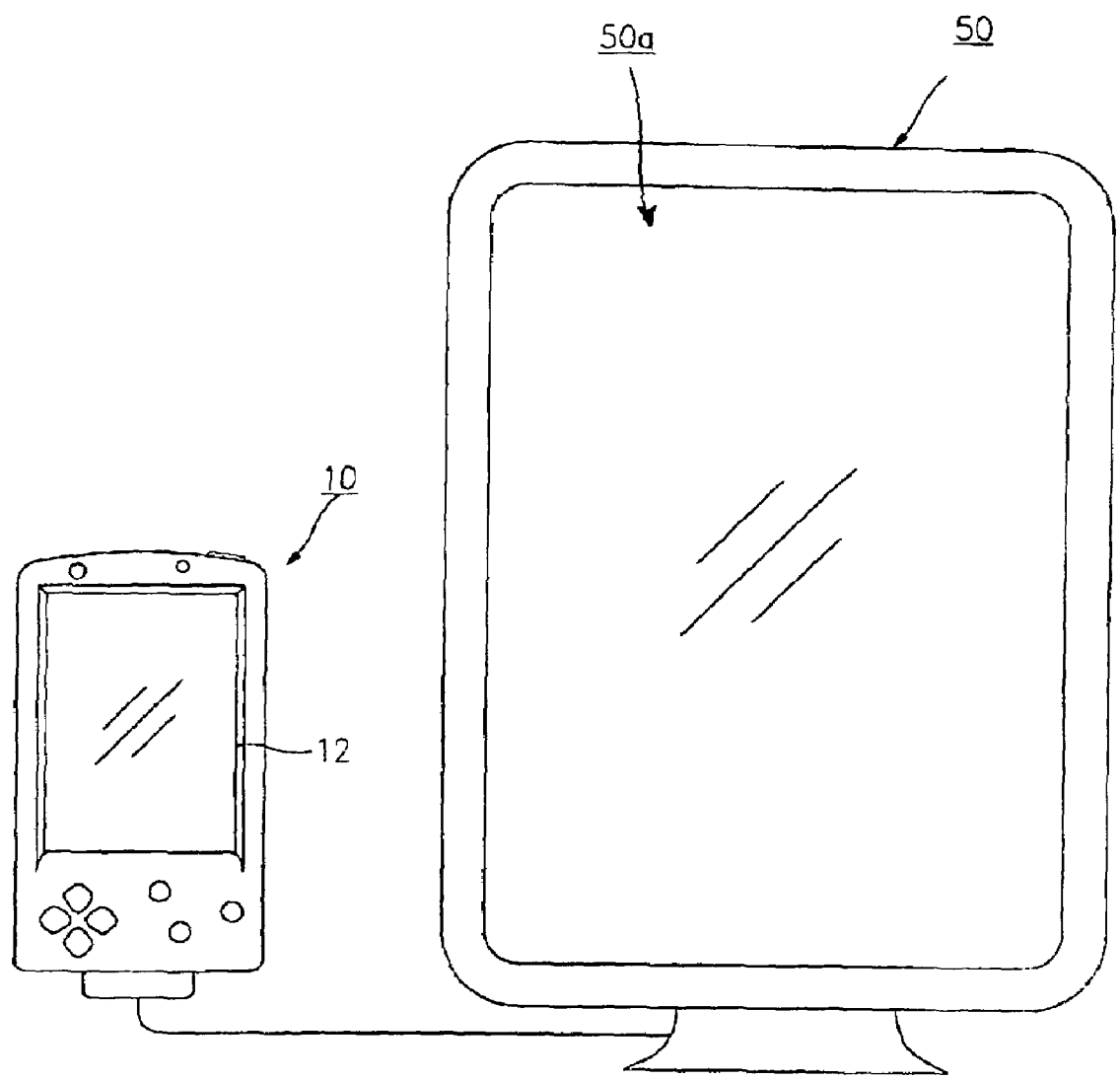
FIG. 1 illustrates a state where a portable digital assistant (PDA) is connected to an external display device.

FIG. 1 illustrates a state where a portable digital assistant (PDA) is connected to an external display device. A PDA 10 can be replaced with other portable terminals having a touch screen, such as a smart phone or a mobile phone. Herein, a state where the contents corresponding to a user input to a touch pad on a touch screen 12 are displayed on an internal display unit of the PDA 10 will be referred to as a "touch screen operation mode". When the PDA user decides to connect the PDA 10 to an external display device 50, the PDA 10 inactivates the touch pad region of the touch screen 12 and displays information on a screen 50a of the external display device 50, instead of the touch pad 12. This will be referred to as a "mouse pad operation mode", whereas the touch screen 12 operates as a mouse pad, as is a well known method for controlling a personal computer. When the touch screen 12 is contacted by a touch screen pen, it performs a pointing function of the mouse, thus enabling the user to access and select information displayed on the screen 50a of the external display device 50, which is larger in size than the touch screen 12. To this end, the PDA calculates a ratio of a screen size of the external display device 50 to a screen size of the touch pad and maps coordinates of the touch pad with coordinates of the screen 20a of the external display device 50.

The PDA 10 can shift a mouse pointer displayed on the screen 50a of the external display device 50 by recognizing touch pad data provided from a touch panel 12a (FIG. 2) on the touch screen 12. More specifically, when the user touches, i.e. applies pressure on, the touch pad region of the touch screen 12 the PDA 10 generates touch pad data according to a coordinate value of the point where the user applied pressure. The PDA 10 transmits the touch pad data to a controller 14 (FIG. 2), which performs a calculation to convert the coordinate value to a calculated value, and then transmits the calculated coordinate to the external display device 50, thereby determining a position of the mouse pointer to be displayed on the screen 50a of the external display device 50. An external display driver 24 (FIG. 2) is optionally included to allow the PDA to more fully control the external display device 50, as described in detail below.

Several specific keys may also be defined to supplement the present invention. The specific keys may include a key for enabling the user to select a certain item (e.g. icon) highlighted using a mouse pointer displayed on the screen 50a of the external display device 50. For example, one such specific key can be defined such that successively pressing a '1'-key and a '4'-key is equivalent to pressing a left button of the mouse. It is also possible for the user to manipulate resolution of the touch screen 12 by pressing an access key or otherwise setting a screen shift access mode. When the user selects the screen shift access mode, the touch pad of the PDA 10 accesses a part (or segment) of the screen 50a of the external display device 50, rather than mapping the entire screen 50a, dividing the screen 50a of the external display device 50 into a plurality of segments (e.g., 4 quadrants). User input to the touch panel will access only one of the quadrants. Accordingly, the controller 14 re-calculates to match the display coordinates of the segment selected of the screen 50a of the external display device 50 to the display coordinates of the touch pad.

In addition, the touch screen 12 according to an embodiment the present invention can be configured to have a separate sensing region at or around a boundary of the touch pad. Thus, when the boundary is touched, the center coordinate of the touch pad shifts to a corresponding quadrant (i.e. segment) on the screen 50a of the external display device 50.

Figure 2:
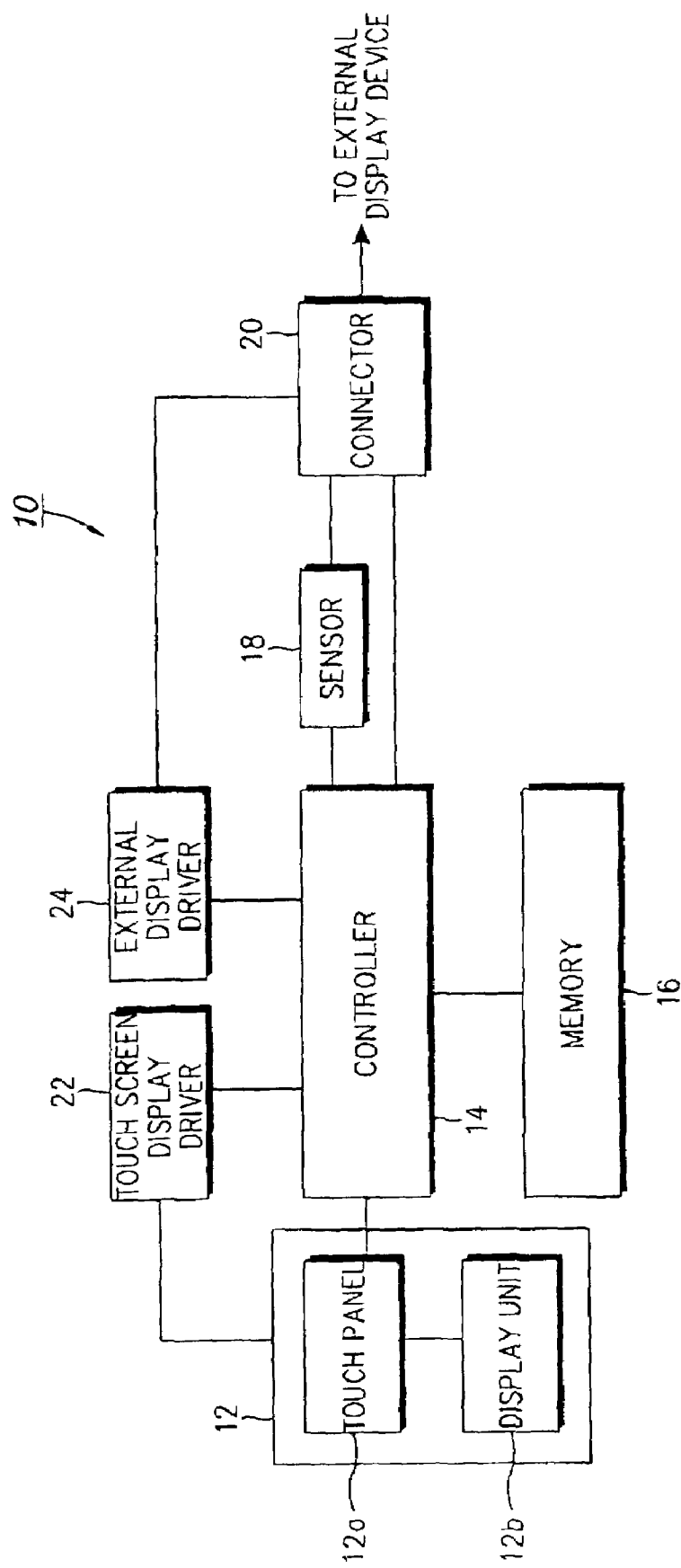
FIG. 2 illustrates a structure of a PDA with a touch screen according to an embodiment of the present invention.

FIG. 2 illustrates a structure of a PDA with a touch screen according to an embodiment of the present invention. Referring to FIG. 2, the touch screen 12 is comprised of a touch panel 12a and a display unit 12b. An LCD (Liquid Crystal Display) is typically used for the display unit 12b. The touch panel 12a functions as a user information input means by generating touch panel data when it recognizes the position where the user applies pressure to a point on the touch screen 12, using either the user's hand or a touch screen pen (e.g. stylus). In the embodiment of the present invention, the touch panel data generated by the touch panel 12a, is used in controlling a position of a mouse pointer on the screen 50a of the external display device 50 in a specific operation mode.

The touch panel 12a mounted on the surface of the display unit 12b is made with transparent materials, so that the user can clearly see the screen displayed on the display unit 12b. For this reason, the term "touch screen" as used herein refers to a combination of the touch panel 12a and the display unit 12b, or separately refers to the touch panel 12a or the display unit 12b. A connector 20 is provided to connect the PDA 10 to the external display device 50. A sensor 18 connected to the connector 20 generates a sensing signal upon detecting the connection between the PDA 10 and the external display device 50. A controller 14 controls the overall operation of the PDA 10. In particular, upon receiving the sensing signal, the controller 14 inactivates the portion of a touch screen display driver 22 corresponding to the touch pad and activates an external display driver 24. Further, when touch panel data is generated as the user touches a certain point on the touch panel 12a, the controller 14 generates a coordinate value corresponding to the touch panel data.

In addition, the controller 14 performs a calculation for mapping the coordinate value with a screen display coordinate of the external display device 50, which is utilized to determine the position of the pointer to be displayed on the screen 50a of the external display device 50. A memory 16 stores a control program of the PDA 10, initial service data, an operating program for processing the touch panel data, and data generated in the process of executing the programs. Further, the memory 16, serving as a buffer, may temporarily store the touch panel data and the data generated during execution of the programs. In addition, the memory 16 stores the coordinate value corresponding to a certain point on the touch panel 12a, and a calculation formula for mapping the coordinate value with an associated screen display coordinate value of the external display device 50. The touch screen display driver 22, operating under the control of the controller 14, drives the touch screen 12, specifically the display unit 12b. The external display driver 24, operating under the control of the controller 14, drives the external display device 50 in the mouse pad operation mode.

Figure 3:
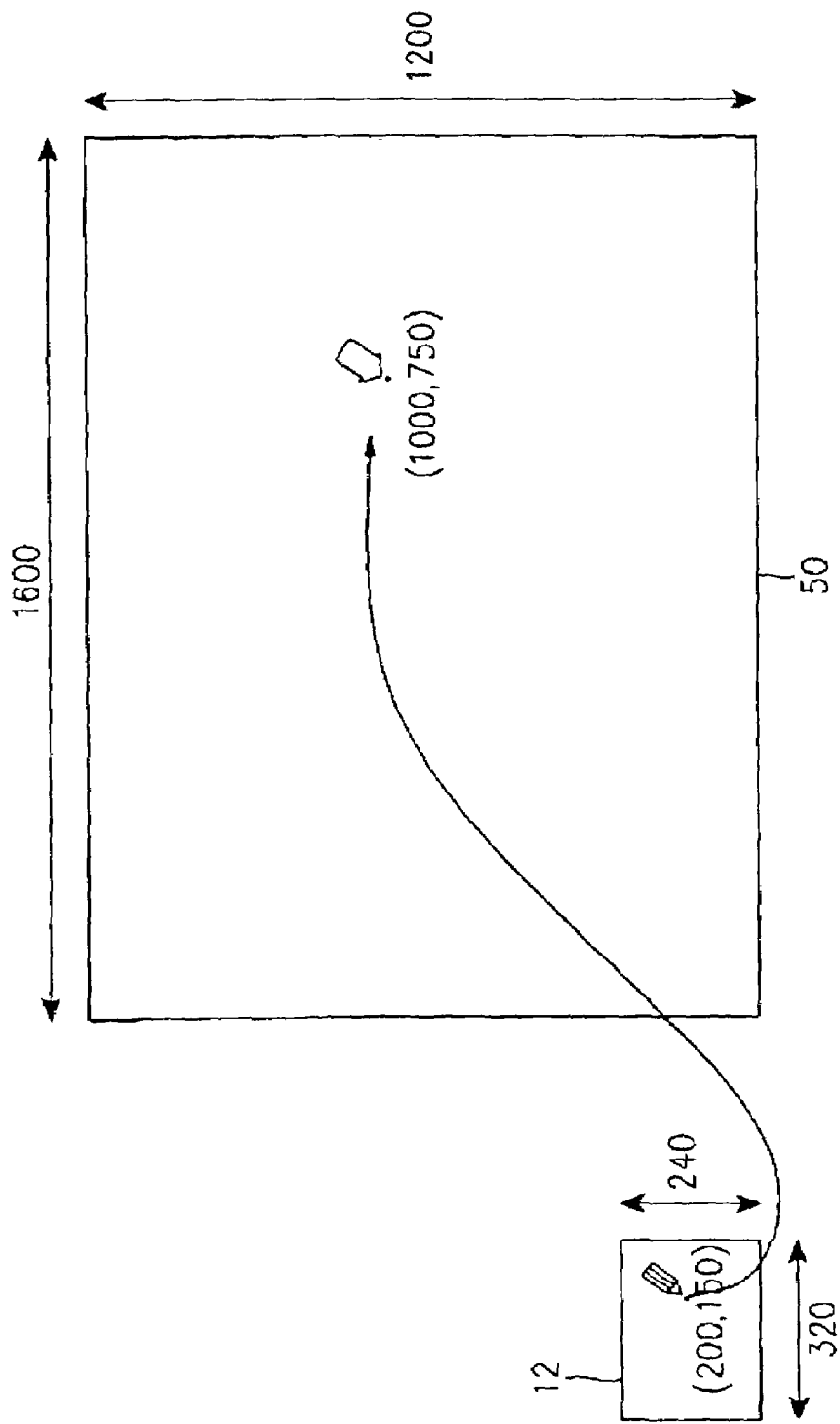
FIG. 3 illustrates how the touch screen is mapped onto a large screen of an external display device according to an embodiment of the present invention.

FIG. 3 illustrates how the touch screen is mapped onto the large screen of the external display device according to an embodiment of the present invention. As illustrated, the touch screen 12 of the PDA 10 is displayed over the entire screen 50a of the external display device 50 and the touch pad region corresponds to the entire touch screen 12 area. In this case, mapping between the touch pad and the larger screen 50a of the external display device 50 is calculated as follows.

If the touch screen 12 has an N×M size and the external screen has a K×L size, the controller 14 of the PDA 10 calculates a scaling factor $$\left(\frac{K}{N}, \frac{L}{M}\right)$$

for screen conversion. When the user touches a coordinate (n,m) on the touch screen 12, the controller 14 accesses a point $$\left(n \times \frac{K}{N}, m \times \frac{L}{M}\right)$$

on the external large screen. When it is necessary to increase resolution of the information displayed on the screen 50a of the external display device 50, the controller 14 maps the touch screen 12 with only a part of the external screen 50a, and not the entire screen 50a of the external display device 50. In this way, it is possible to increase the size of the information displayed on the screen 50a of the external display device 50 at a specific ratio according to an aspect ratio of the touch screen 12. For example, in order to zoom-in or zoom-out by a factor of alpha ($\alpha$) times in a horizontal direction and beta ($\beta$) times in a vertical direction, the controller 14 accesses a point $$\left(\frac{n}{\alpha} \times \frac{K}{N}, \frac{m}{\beta} \times \frac{L}{M}\right)$$

on the external large screen, when the user touches the point (n,m) on the touch screen 12. In FIG. 3, since the touch screen 12 has a 320×240 size and the external screen has a 1600×1200 size, the scaling factors $\alpha$ and $\beta$ are both 5. As a result, a coordinate (200,150) on the touch screen 12 corresponds to a coordinate (1000,750) on the screen of the external display device 50. Although the scaling factors $\alpha$ and $\beta$ are set to the same value in this embodiment of the present invention, they can also be set to different values.

Figure 4:
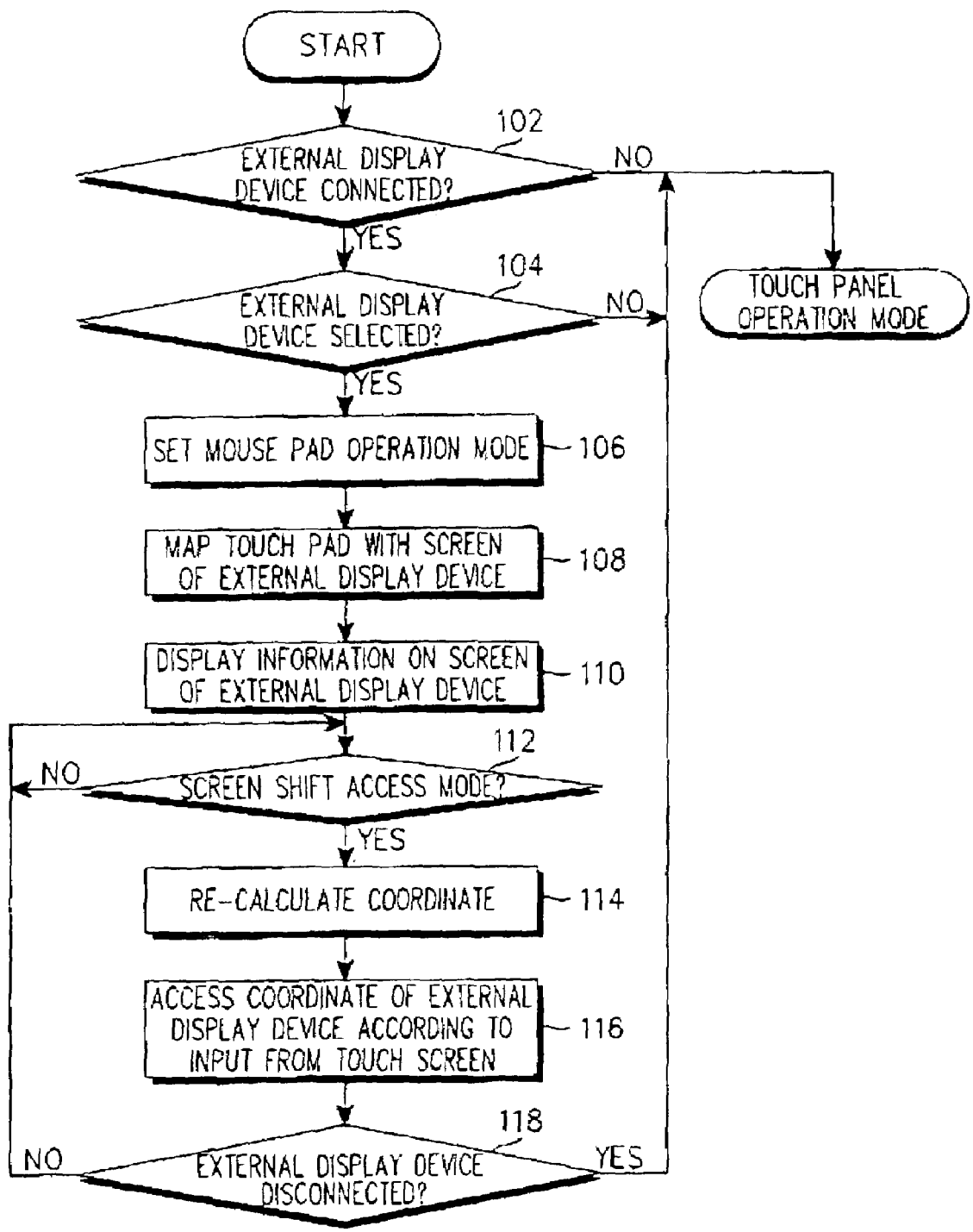
FIG. 4 illustrates a procedure for enabling the touch screen of the PDA to serve as a mouse pad and displaying a screen of the PDA on the external display device according to an embodiment of the present invention.

FIG. 4 illustrates a procedure for enabling the touch pad of the PDA to serve as a mouse pad and for displaying a screen of the PDA on the external display device according to an embodiment of the present invention.

Referring to FIGS. 1 to 4, the controller 14 of the PDA 10 determines in step 102 whether the PDA 10 is connected to the external display device 50, by means of the sensor 18. At this moment, the controller 14 may display a message inquiring of the user whether to select the external display device 50. The controller 14 determines in this optional step 104 whether the user has selected the external display device 50. If the user has selected the external display device 50, the controller 14 sets the mouse pad operation mode in step 106. In the mouse pad operation mode, the controller 14 disables the touch screen driver 22 for the touch pad region and enables the external display driver 24 or provides input via connector 20 to the display driver of the external display device 50. In step 108, the controller 14 maps the screen of the touch pad with the screen 50a of the external display device 50. The mapping is performed by calculating scaling factors for screen conversion between the N×M screen of the touch pad and the K×L screen 50a of the external display device 50, as described above. In step 110, the controller 14 displays data and image information on the screen 50a of the external display device 50. In this state, the user can utilize the touch pad to select a desired item displayed on the screen of the external display device 50.

In step 112, if the user selects a point (n,m) on the touch pad, the controller 14 accesses a point corresponding to the value calculated in step 108, on the screen 50a of the external display device 50. The controller 14 checks whether a screen shift access mode is selected or not in step 114. If the screen shift access mode is selected, the controller 14 re-calculates the coordinates in step 116, enters the screen shift access mode, and then monitors whether the external display device 50 is disconnected through a sensor 18 in step 118. At this time, upon detecting disconnection of the external display device 50, the controller 14 switches its operation mode to the touch screen operation mode. Otherwise, next step returns to the step 112.

If the screen shift access mode is not selected in the step 114, next step is step 118, in which the controller 14 monitors whether the external display device is disconnected, as described above in regard to step 111.

If the user elects not to use the external display device 50 in step 104, the controller 14 never enters the mouse pad operation mode and remains in the touch screen operation mode.

Figure 5:
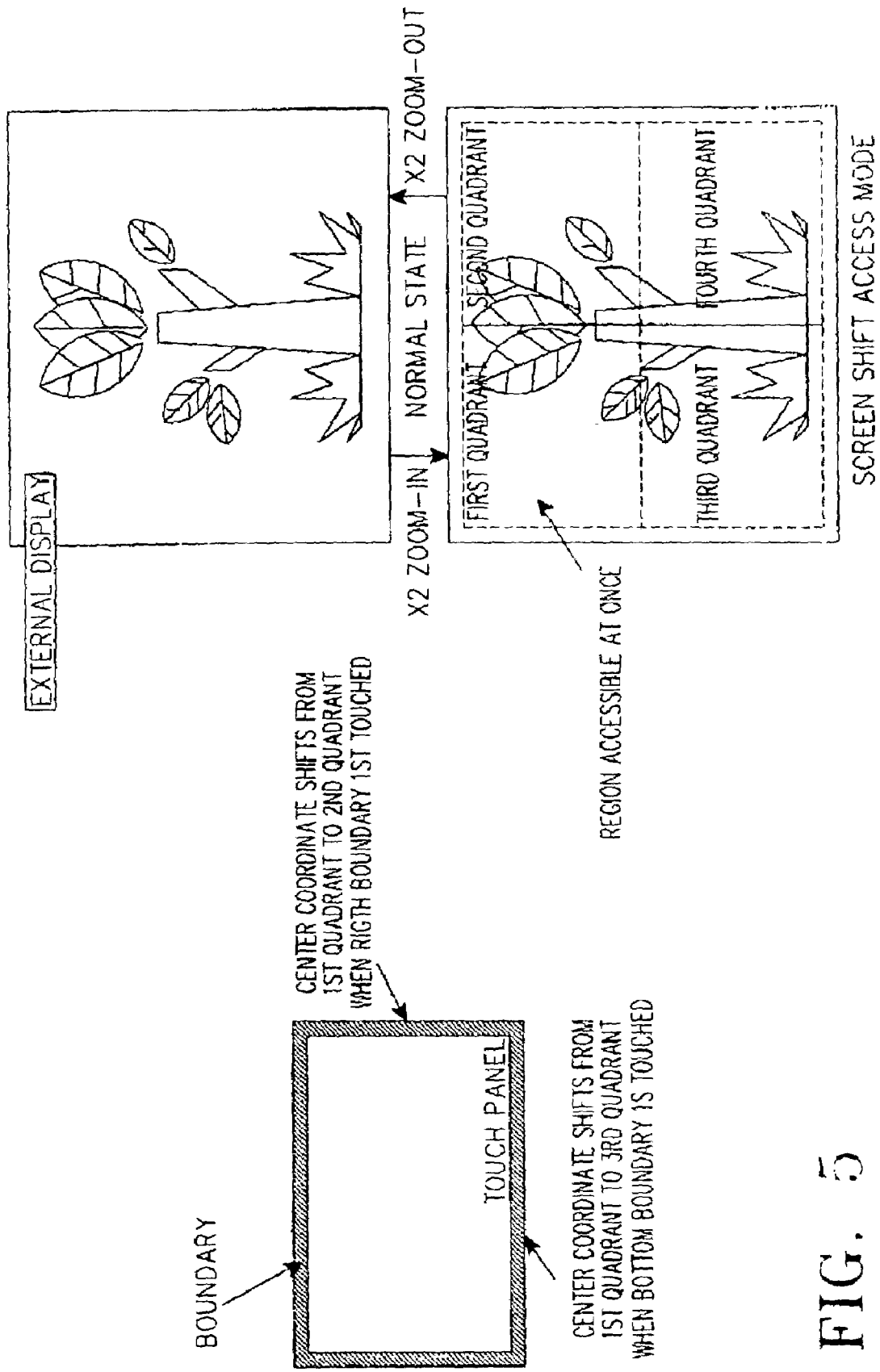
FIG. 5 illustrates a screen display state in a zoom-in access mode according to an embodiment of the present invention.

FIG. 5 illustrates a screen display state in a zoom-in access mode according to an embodiment of the present invention. In the mouse pad operation mode where the external display device 50 is selected, the user may press a specific key to enter a screen shift access mode. The screen 50a of the external display device 50 is divided into a plurality of segments (described using 4 quadrants similar to those in the screen shift access mode), and the touch pad can selectively access any one of the quadrants. In contrast to the screen shift access mode, in which all four quadrants are displayed on screen 50a, the screen shift mode displays fewer than all quadrants, and when the user touches a boundary of the touch pad, the screen 50a shifts to display an adjacent quadrant.

As described above, the present invention can solve the inconveniences caused by the small screen of the PDA. That is, the invention connects the PDA to the external display device to display information on the large screen of the external display device. Further, the touch screen serves as the mouse pad so that the user can easily access and select from the options displayed among the information displayed on the external larger size screen.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus having a touch screen including a touch pad, comprising:
    a connector for connecting the apparatus to an external display device;
    a sensor for generating a sensing signal upon detecting a connection between the apparatus and the external display device;
    a touch screen display driver for displaying data input from the touch pad on the touch screen;
    an external display driver for displaying touch pad data on the external display device and; and
    a controller for, upon receiving the sensing signal, setting a mouse pad operation mode where data input from the touch pad of the touch screen are displayed only on the external display device, not on the touch screen, enabling the external display driver, and setting a screen shift access mode by a specific key input from a user for changing a size of a screen to be displayed at a specific ratio in the mouse pad operation mode,
    wherein the controller recognizes a point on the touch pad selected by the user, generates a coordinate value corresponding to the point, calculates for mapping the coordinate value with a screen display coordinate of the external display device according to the specific ratio, and determines a position of a pointer to be displayed on a screen of the external display device.

2. The apparatus as claimed in claim 1, wherein the touch screen is part of a personal digital assistant (PDA).

3. The apparatus as claimed in claim 1, further comprising a memory for storing a calculation formula for generating the coordinate value.

4. A method for displaying on a screen of an external display device information input on a PDA (Personal Digital Assistant) having a touch screen, comprising:
    determining if the PDA is connected to the external display device;
    switching a touch screen operation mode to a mouse pad operation mode, upon detection of a connection between the PDA and the external display device;
    accessing a screen display coordinate of the external display device according to touch panel coordinate data input by the touch pad of the touch screen;
    setting a screen shift access mode, if a user inputs a specific key for changing a size of a screen to be displayed at a specific ratio in the mouse pad operation mode where data input from the touch pad of the touch screen are displayed only on the external display device, not on the touch screen;
    calculating for mapping a coordinate value with a screen display coordinate of the external display device according to the specific ratio; and
    determining a position of a pointer to be displayed on a screen of the external display device.

5. The method as claimed in claim 4, wherein the mapping further comprises:
    upon detecting the connection between the apparatus and the external display device, entering a mouse pad operation mode, when it is determined that the user has selected the external display device;
    performing a calculation for mapping the first display coordinate with the second display coordinate, when the user has selected the external display device; and
    remaining in a touch screen operation mode when the user does not select the external display device.

6. The method as claimed in claim 5, further comprising:
    disabling displaying information on the touch pad when the user selects the external display device and enters the mouse pad operation mode.

7. The method as claimed in claim 4, further comprising determining if the PDA is disconnected from the external display device; and
    disabling displaying information through the external display device and switching to a touch screen operation mode to display information on the touch screen, when the PDA is disconnected from the external display device.

8. The method as claimed in claim 4, wherein the screen of the external display device is divided into a plurality of segments, and at least one segment is accessible by a touch pad of the touch screen, and selection of a boundary of the touch pad shifts the screen of the external display device to an adjacent segment.

9. The method as claimed in claim 8, wherein the screen of the external display device displays the segment accessible by the touch pad in an enlarged format.

* * * * *